(12) United States Patent
Lay (10) Patent No.: US 6,206,073 B1
(45) Date of Patent: Mar. 27, 2001

(54) SAFETY SYSTEM FOR USE WITH A GRAIN BIN

(76) Inventor: John Jacob Lay, 9388 Lay Rd., Tremont, IL (US) 61568-9185

( * ) Notice: Subject to any disclaimer, the term of this patent is extended or adjusted under 35 U.S.C. 154(b) by 0 days.

(21) Appl. No.: 09/416,244

(22) Filed: Oct. 12, 1999

(51) Int. Cl.⁷ ................................................... E05F 15/20
(52) U.S. Cl. ......................................................... 160/1; 49/31
(58) Field of Search ............................... 160/370.1, 188, 160/1, 2, 9, 405; 49/141, 31, 32, 33; 307/328, 326, 116; 192/129 R (56) References Cited

U.S. PATENT DOCUMENTS

| | | |
|---|---|---|
| 1,631,024 | 5/1927 | Fisher . |
| 1,657,714 | 1/1928 | Griffith et al. . |
| 1,832,444 | 11/1931 | Berger . |
| 2,671,531 | 3/1954 | Holmstrom ............................. 187/59 |
| 3,243,535 | 3/1966 | Platz et al. ............................. 200/50 |
| 3,477,593 | 11/1969 | Whitham ............................. 214/16 |
| 3,532,233 | 10/1970 | Skelton ................................. 214/17 |
| 3,546,410 | 12/1970 | Brighenti ............................. 200/153 |
| 3,710,986 | * 1/1973 | Lepley ............................... 222/185.1 |
| 3,742,162 | 6/1973 | Wasemann ........................ 200/61.62 |
| 4,000,693 | 1/1977 | Kaiser et al. ........................ 101/183 |
| 4,052,108 | * 10/1977 | Weaver et al. ........................ 406/161 |
| 4,071,977 | * 2/1978 | Price ........................................ 49/70 |
| 4,093,834 | 6/1978 | Stranczek ............................. 200/50 |
| 4,260,313 | * 4/1981 | Van Dusen ........................... 414/313 |
| 4,289,440 | * 9/1981 | Walberg ............................... 414/523 |
| 4,405,844 | 9/1983 | Dizon et al. ........................... 200/50 |
| 4,672,160 | 6/1987 | Katoh . |
| 4,806,710 | 2/1989 | Kalvaitis et al. ...................... 200/50 |
| 5,177,469 | 1/1993 | Igarashi et al. ...................... 340/673 |
| 5,780,792 | 7/1998 | Fritts et al. ........................ 200/50.02 |

\* cited by examiner

*Primary Examiner*—David M. Purol
(74) *Attorney, Agent, or Firm*—Marshall, O'Toole, Gerstein, Murray & Borun (57) ABSTRACT

A safety system for reducing the risk of a suffocation accident occurring in a grain bin is disclosed. The disclosed safety apparatus includes an electrical switch in circuit with the motor of an auger mounted in the grain bin for discharging grain therefrom. The switch has a first state wherein the switch prevents operation of the motor and a second state wherein the switch permits operation of the motor. The disclosed apparatus also includes a cover mounted adjacent the access opening for movement between a first position wherein the cover precludes human entry through the access opening and a second position wherein the cover is displaced from the first position. The switch and the cover are positioned to place the switch in the second state when the cover is in the first position and to place the switch in the first state when the cover is displaced from the first position. The apparatus is further provided with a latch for securing the cover in the first position. Additionally, the apparatus includes a spring for biasing the cover toward the second position such that, when the latch and cover are released, the cover moves to the second position and the switch enters the first state to preclude operation of the motor and auger.

22 Claims, 8 Drawing Sheets

SAFETY SYSTEM FOR USE WITH A GRAIN BIN

FIELD OF THE INVENTION

The invention relates generally to grain bins, and, more particularly, to a safety system for reducing the risk of a suffocation accident occurring in a grain bin.

BACKGROUND OF THE INVENTION

Figure 1:
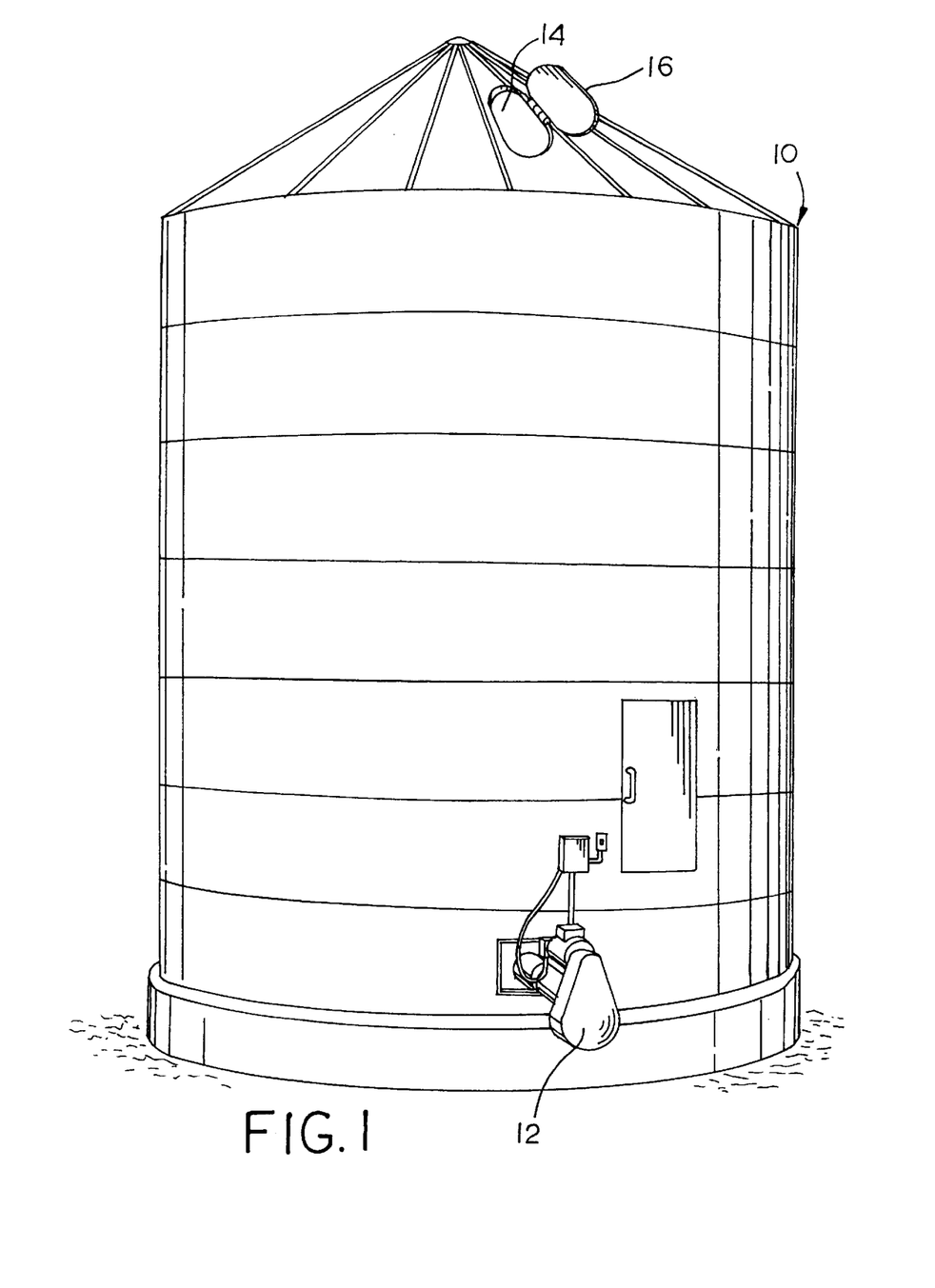
FIG. 1 is a schematic illustration of an exemplary grain bin having an access opening with the manhole cover in the open position.

Grain bins are large, generally cylindrical sheds for storing grain. An exemplary grain bin 10 is shown in FIG. 1. An auger (not shown) is disposed within the bin 10 adjacent the bottom of the bin 10. The auger is electrically powered and is run to remove grain from the bin 10 via a discharge opening 12. When the auger is actuated, the grain inside the bin 10 drains downward in a funnel-like fashion.

As illustrated in FIG. 1, grain bins are provided with an access opening 14 in their roofs through which a person may enter the bin 10. The access opening 14 is usually provided with a hinged door or manhole cover 16 (see FIG. 1) to protect the grain stored in the bin 10 from weather elements such as rain. From time to time, grain can become jammed in the bin 10 such that the auger does not move or, if it moves, little or no grain is discharged. Although it is quite dangerous to do so, individuals sometimes respond to such jamming by entering the grain bin 10 and jumping in the grain to release the jam. Sometimes this process is performed while the auger is supplied with power (i.e., with the auger in the "on" or "run" condition). If a person jumping in the grain releases the jam with the auger in the run state, the auger can start to pull the grain downward in a funnel like manner. If a person is in the grain bin 10 when the grain starts to flow in this manner, they will quickly be pulled under the grain and may subsequently be suffocated.

SUMMARY OF THE INVENTION

In accordance with an aspect of the invention, a safety apparatus is disclosed for use with a grain bin having an auger, a motor for driving the auger, and an access opening. The safety apparatus includes an electrical switch in circuit with the motor. The switch has a first state wherein the switch prevents operation of the motor and a second state wherein the switch permits operation of the motor. The apparatus also includes a cover mounted adjacent the access opening for movement between a first position wherein the cover precludes human entry through the access opening and a second position wherein the cover is displaced from the first position. The switch and the cover are positioned to place the switch in the second state when the cover is in the first position and to place the switch in the first state when the cover is displaced from the first position. The apparatus is further provided with a latch for securing the cover in the first position. Additionally, the apparatus includes a spring for biasing the cover toward the second position such that, when the latch and cover are released, the cover moves to the second position and the switch enters the first state to preclude operation of the motor and auger.

In accordance with another aspect of the invention, a kit is disclosed for use with a grain bin having an auger, a motor for driving the auger, and an access opening for entering the bin. The kit includes an electrical switch adapted to be connected in circuit with the motor to selectively prevent operation thereof. It also includes a cover adapted to be mounted adjacent the access opening of the grain bin for movement between a first position wherein the cover precludes human entry through the access opening and a second position wherein the cover is displaced from the first position. The cover is adapted to disengage the switch to permit operation of the motor when the cover is displaced from the first position and to operatively engage the switch to prevent operation of the motor when the cover is in the first position. The kit is further provided with a latch which is adapted to secure the cover in the first position. Moreover, the kit includes a spring adapted to bias the cover toward the second position such that, when the kit is assembled and mounted to the grain bin and the latch and cover are released, the cover moves away from the first position and the switch precludes operation of the motor and auger.

In accordance with still another aspect of the invention, a safety apparatus is provided for use with a grain bin having an auger, a motor for driving the auger, and an access opening. The safety apparatus includes an electrical switch in circuit with the motor. The switch has a first state wherein the switch prevents operation of the motor and a second state wherein the switch permits operation of the motor. The apparatus is also provided with a cover mounted adjacent the access opening for movement between a first position wherein the cover precludes human entry through the access opening and a second position wherein the cover is displaced from the first position. Additionally, the apparatus includes means for placing the switch in the second state when the cover is in the first position and for placing the switch in the first state when the cover is displaced from the first position. The apparatus further includes a latch for securing the cover in the first position. Moreover, the apparatus is also provided with a spring for biasing the cover toward the second position such that, when the latch and cover are released, the cover moves to the second position and the switch enters the first state to preclude operation of the motor and auger.

In accordance with still another aspect of the invention, a method is disclosed for reducing a risk of suffocation within a grain bin having an auger, a motor for running the auger, and an access opening. The method comprises the step of mounting a cover adjacent the access opening for movement between a first position wherein the cover precludes human entry through the access opening and a second position wherein the cover is displaced from the first position. It also includes the step of placing a switch in circuit with the motor such that placing the switch in a first operative state precludes operation of the auger and placing the switch in a second operative state permits operation of the auger. The method additionally includes the step of locating the cover and the switch for interaction such that the switch enters the first operative state when the cover is displaced from the first position. Further, the method includes the step of biasing the cover toward the second position such that the auger cannot be operated unless the cover is secured in the first position.

Other features and advantages are inherent in the disclosed apparatus or will become apparent to those skilled in the art from the following detailed description and its accompanying drawings.

DESCRIPTION OF THE PREFERRED EMBODIMENTS

Figure 2:
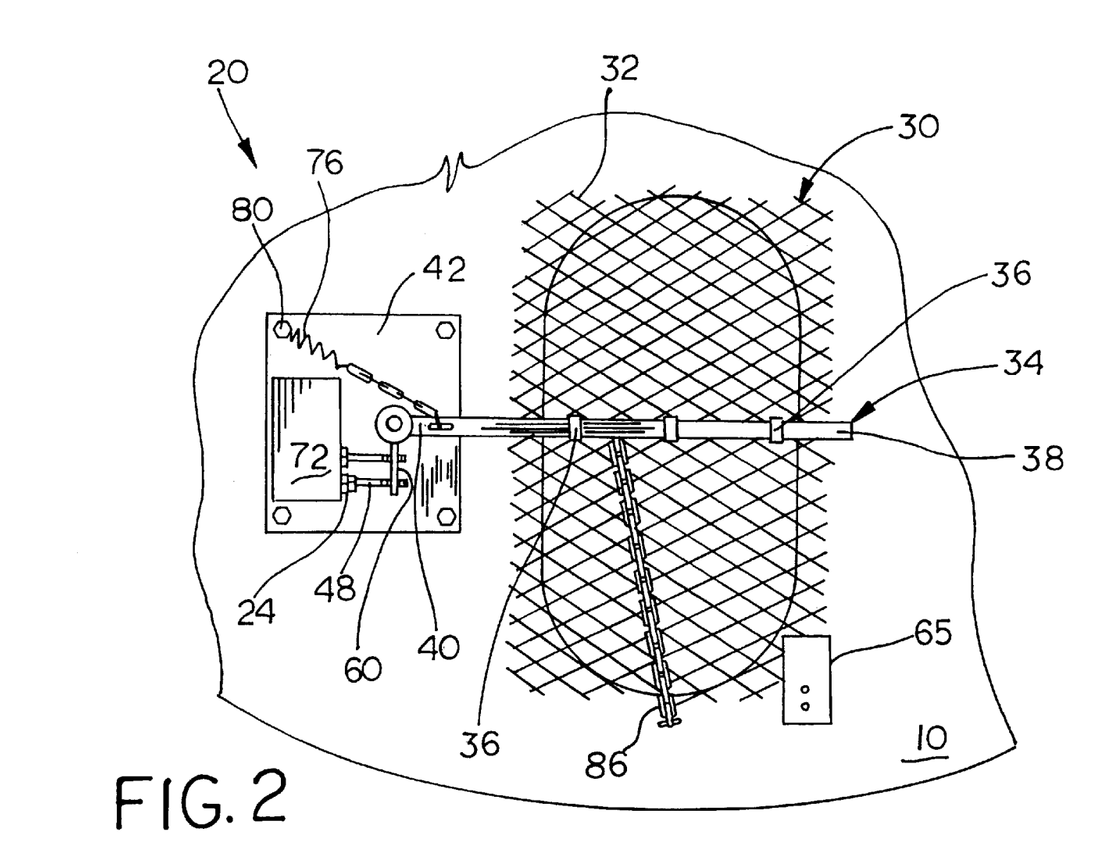
FIG. 2 is a plan view of a safety system constructed in accordance with the teachings of the instant invention and shown mounted adjacent the access opening within a grain bin such as the bin shown in FIG. 1.

A safety apparatus 20 constructed in accordance with the teachings of the invention is shown in FIG. 2. The illustrated apparatus 20 is shown mounted within the grain bin 10 of FIG. 1 adjacent the access opening 14. While in this detailed description and the accompanying drawings, the apparatus 20 is discussed and illustrated as being mounted within a particular type of grain bin, persons of ordinary skill in the art will readily appreciate that the teachings of the invention are in no way limited to any particular environment of use. On the contrary, the teachings of the invention may be applied in any environment which would benefit from the enhanced safety it provides.

Figure 3:
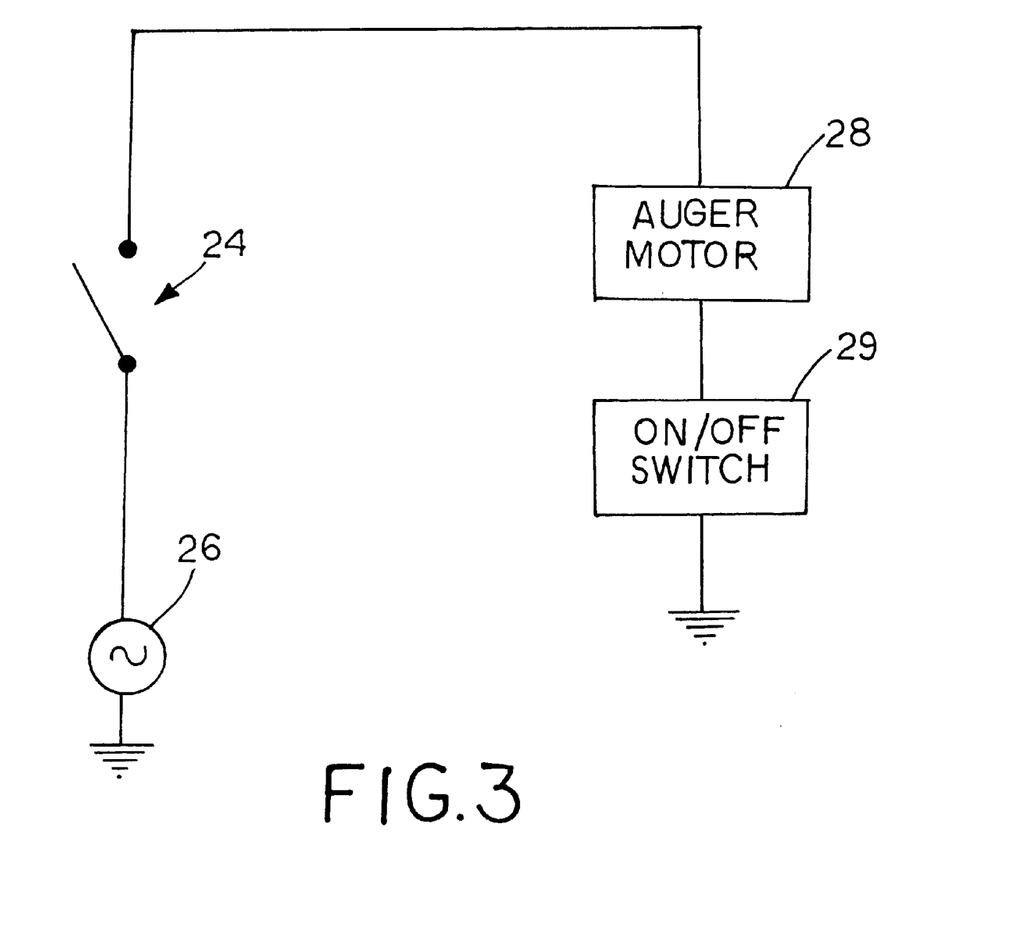
FIG. 3 is a schematic illustration showing the electrical connection of the safety system of FIG. 2 to the circuit supplying power to the auger of the grain bin.

For the purpose of substantially rendering the auger (not shown) of the grain bin 10 inoperative, the safety apparatus 20 is provided with an electrical switch 24. As shown in FIG. 3, when the apparatus 20 is in use, the electrical switch 24 is preferably connected in circuit with both a power supply 26 and an auger motor 28. When supplied with power by supply 26, and when actuated by an on-off switch 29, the auger motor 28 drives the auger to discharge grain from the grain bin 10 as explained above. In the illustrated embodiment, the electrical switch 24 is a contact switch that has an opened position wherein the switch 24 prevents power flow from the power supply 26 to the auger motor 28 to thereby render the auger inoperative, and a closed position wherein the switch 24 permits power flow from the supply 26 to the auger motor 28 to thereby enable operation of the motor 28 upon closure of the on-off switch 29.

In the example of FIG. 3, the switch 24 is connected in series with the supply 26 and the motor 28, and is located between those two elements 26, 28. However, persons of ordinary skill in the art will readily appreciate that other circuit arrangements can be employed without departing from the scope or spirit of the invention. By way of example, not limitation, the positions of the switch 24 and the auger motor 28 may optionally be reversed in FIG. 3 without departing from the scope or spirit of the invention. By way of another example, not limitation, the switch 24 can be coupled in parallel with the motor 28 to divert power away from the motor 28 to another (lower impedance) element such as an indicator light which illuminates to indicate that the auger is inoperative without departing from the scope or spirit of the invention.

Persons or ordinary skill in the art will also appreciate that, while in the illustrated example, the power supply 26 is implemented by a commercial three-phase supply (e.g., a public electrical utility company), other power supplies (either AC or DC) can be used in this role without departing from the scope or spirit of the invention. Of course, the auger motor 28 should either be adapted to use with the selected supply, or appropriate voltage level converting and/or rectification or DC-AC converting circuitry (not shown) should be used to render the motor 28 usable with the selected supply 26.

In order to prevent humans from entering the grain bin 10 through the grain bin opening 14 when the auger motor 28 is operable, the safety apparatus 20 is further provided with a cover 30. The cover 30 is mounted adjacent the access opening 14 for movement between a closed position such as that shown in FIG. 2 wherein the cover 30 precludes human entry through the access opening 14, and an opened position such as that shown in FIG. 4 wherein the cover 30 is displaced from the closed position to permit human entry to the grain bin 10 through the opening 14.

Although persons of ordinary skill in the art will readily appreciate that the cover 30 can be implemented in many ways without departing from the scope or spirit of the invention, in the illustrated embodiment the cover 30 is implemented by a mesh screen 32 and a main support arm 34. The screen 32 is mounted to the main support arm 34 by conventional fasteners 36 such as the clamps 36 shown in FIG. 2. The main support 34 includes a free end 38 and a secured end 40. The secured end 40 is pivotably mounted (either directly or through another element such as a mounting plate 42) to the grain bin 10. Therefore, the main support arm 34 and, thus, the screen 32 are mounted within the grain bin 10 for pivoting movement between the opened and closed positions in a plane which is substantially parallel to the access opening 14.

Figure 5:
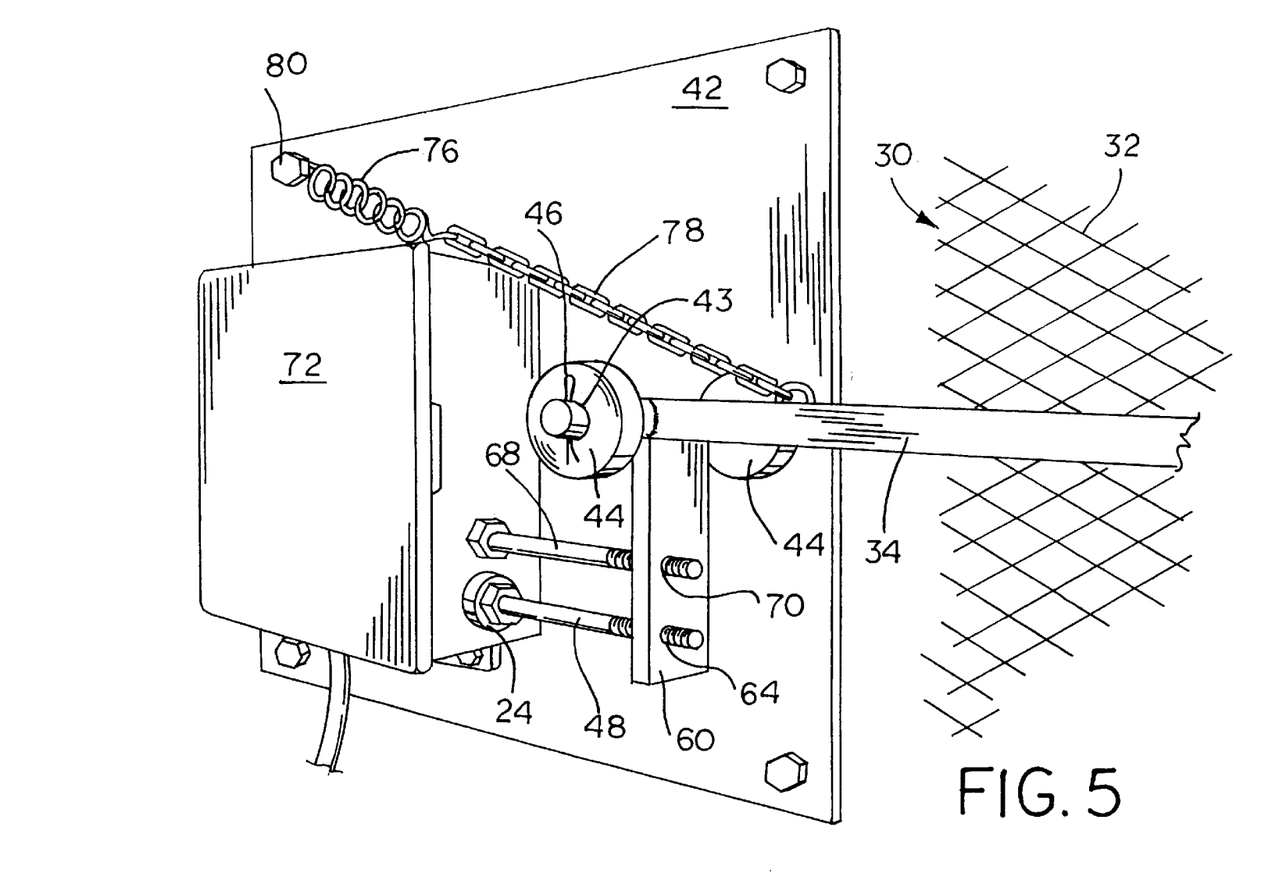
FIG. 5 is an enlarged view of the switch and spring mechanism of the safety system shown in FIG. 2.

While it will be appreciated by persons of ordinary skill in the art that the mesh screen 32 can be implemented in various ways without departing from the scope or spirit of the invention, in the illustrated example the screen 32 is substantially rigid and is implemented by expanded metal. Similarly, while the main support arm 34 and the fasteners 36 can be implemented in many ways without departing from the scope or spirit of the invention, in the illustrated example the main support arm 34 is implemented by square tube steel and the fasteners are implemented by 2⁵⁄₁₆ inch bolts and washers. Finally, although the hinge coupling the main support arm 34 to the mounting plate 42 can also be implemented in many ways without departing from the scope or spirit of the invention, in the illustrated example, it is implemented by providing the secured end 40 of the main support arm 34 with a cylindrical bore (not shown) which is sized to slidably receive a hinge pin 43. As most easily seen in FIG. 5, the hinge pin 43 is mounted to, and projects outwardly from, the mounting plate 42. The bore in the secured end 40 of the main support arm 34 mates with the hinge pin 43 such that the main support arm 34 can be pivoted about the pin 43. Two washers or bearings 44 are also disposed on the hinge pin 43, one on each side of the main support arm 34. As shown in FIG. 5, the hinge pin 43 includes a bore. A cotter pin 46 is removably secured in this bore to ensure the main support arm 34 and the washers 46 do not slide off of the hinge pin 43 during use.

In order to ensure the auger motor 28 is not operable when the cover 30 is in the opened position and is operable when the cover 20 is closed, the apparatus 20 is further provided with means for placing the switch 24 in the closed state when the cover 30 is in the closed position and for placing the switch 24 in the opened state when the cover 30 is displaced from the closed position. While persons of ordinary skill in the art will readily appreciate that the placing means can be implemented in many ways without departing from the scope or spirit of the invention, the placing means is preferably implemented by a projection 48 which is operatively coupled to the cover 30 in a position to operatively engage the switch 24 to place the switch in the closed state when the cover enters the closed position.

More specifically, as mentioned above, the switch 24 is preferably implemented by a contact switch. The projection 48, on the other hand, is preferably mounted to pivot with the main support arm 34 and is preferably located to engage the switch 24 only when the cover 30 is closed. In the illustrated example, the apparatus 20 includes a supplemental support arm 60 which is coupled to the main support arm 34. As shown in FIG. 5, the supplemental support arm 60 is secured to the main support arm 34 such that the arms 34, 60 are generally perpendicular. A threaded bore 64 is defined near the lower end of the supplemental support arm 60. The projection 48, which is implemented in this example by a bolt, is threaded into the bore 64 such that the projection 48 extends outward from the supplemental support arm 60 in a plane generally parallel to, but displaced from, the plane of the main support arm 34. Since the projection 48 is threaded, the distance it extends from the supplemental support arm 60 can be easily adjusted by threading the projection 48 further into or out of the bore 64 to thereby ensure the projection 48 depresses the contact switch 24 sufficiently to close the switch 24 when the cover 30 enters the closed position but does not depress the switch sufficiently to enter the closed state until the cover 30 enters the closed position.

Since the placing means is preferably implemented by a projection 48 which selectively depresses a switch 24, persons of ordinary skill in the art will readily appreciate that, in the preferred embodiment, the switch 24 is spring biased toward the opened stated in a conventional manner. In view of this preferred mode of operation, persons of ordinary skill in the art will readily appreciate that, as used herein the term "placing" includes both active placing (i.e., acting upon the switch 24 to change its state) and passive placing (i.e., disengaging the switch 24 to permit another element such as a spring to change the state of the switch 24).

Moreover, although in the preferred embodiment the placing means is implemented by a projection and the switch 24 by a contact switch, persons of ordinary skill in the art will readily appreciate that other equivalent structures can be employed as the placing means without departing from the scope or spirit of the invention. By way of examples, not limitations, the placing means can be implemented by a sensor for detecting the position of the cover 30 and a logic circuit (programmable or hard wired) in communication with the sensor for changing the state of the switch 24 based on the output of the sensor. Various known sensors can be implemented in this role. By way of example, not limitation, the sensor can be implemented by an optical sensor wherein a beam of light directed toward the sensor is occluded when the cover 30 enters a predefined position (e.g., the closed position), or by an inductive sensor which senses the position of the cover 30 by sensing a magnetic field (generated, for example, by a permanent magnet mounted on a portion of the cover 30) without departing from the scope or spirit of the invention.

Figure 4:
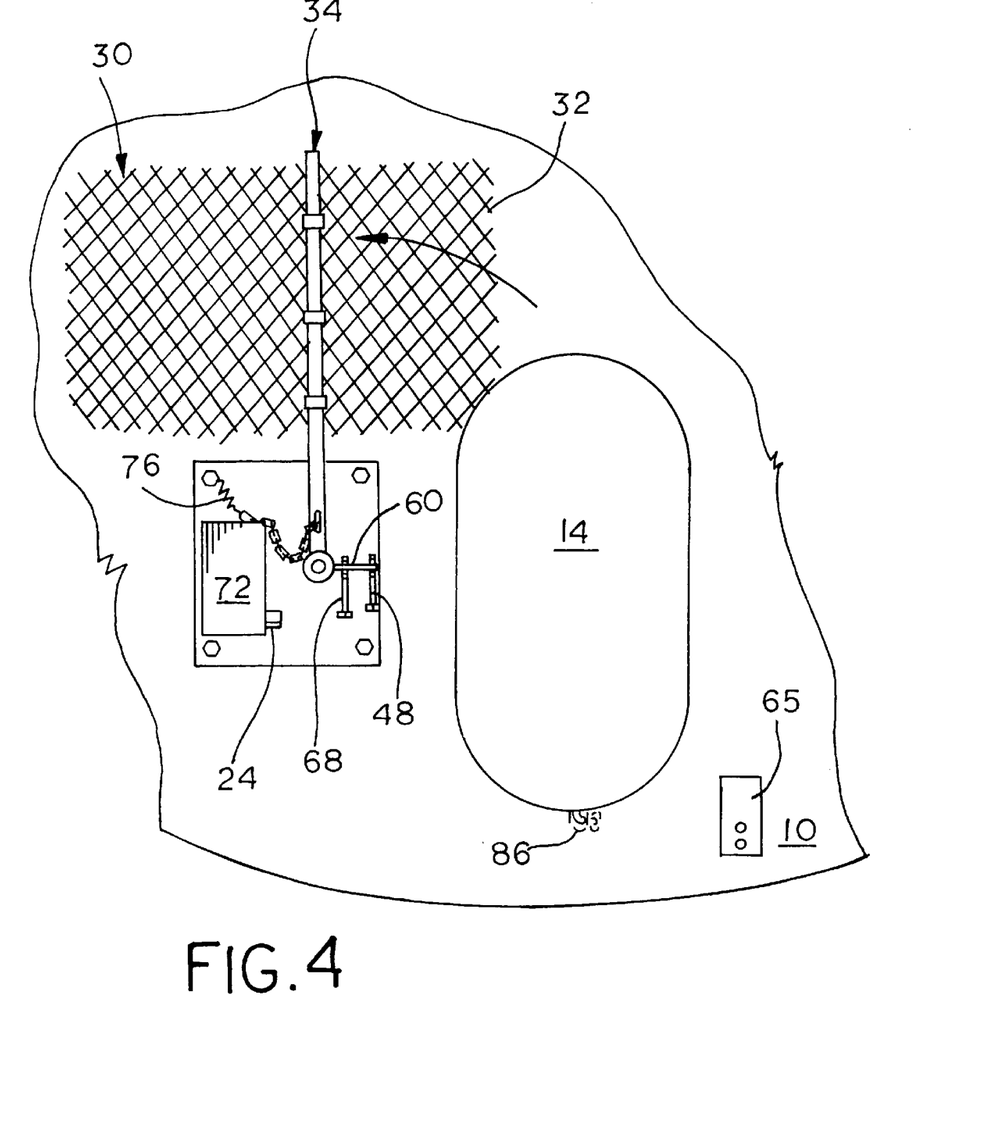
FIG. 4 is a view similar to FIG. 2, but illustrating the access opening with the cover of the safety system of FIG. 3 in an exemplary opened position.

To define the closed position of the cover 30, the apparatus 20 is further provided with a catch 65 which is secured to the bin 10 by conventional fasteners such as bolts. As shown in FIGS. 2 and 4, the catch 65 is located near the corner of the access opening 14. In the illustrated example, the catch 65 is implemented by a metal arm that has a first portion mounted to the grain bin 10 and a second portion separated from the grain bin 10 to define a receiving channel therebetween. As shown in FIG. 2, the catch 65 prevents the cover 30 from pivoting downward past the closed position and defines one limit on the range of motion of the main support arm 34. Since the catch 65 receives part of the screen 32 within the channel, the catch 65 also functions to provide further support for the screen 32 when the cover 30 is in the closed position.

Although the preferred embodiment employs the catch 65 as described above, in a less preferred alternative, the catch 65 is eliminated and the apparatus 20 is provided with a stop member 68 to define the closed position of the cover. As shown in FIG. 5, in the illustrated example, the stop member 68 is implemented by a threaded bolt which mates with a threaded bore 70 defined in the supplemental support arm 60. As also shown in FIG. 5, the stop member 68 extends from the supplemental support arm 60 by a distance sufficient to ensure the stop member 68 engages a side of a switch housing junction box 72 to stop the cover 30 in the closed position. The engagement of the stop member 68 and switch housing 72 prevents the cover 30 from pivoting downward past the closed position and defines one limit on the range of motion of the main support arm 34. Persons of ordinary skill in the art will appreciate that, in the preferred embodiments employing the catch 65, the stop member 68 is superfluous and is not included in the apparatus 20.

For the purpose of biasing the cover 30 away from the closed position (e.g., toward the opened position), the apparatus 20 is further provided with a spring 76 which is operatively coupled between the grain bin 10 and the main support arm 34. As most easily seen in FIG. 5, the illustrated spring 76 is not directly coupled to either the grain bin 10 or the main support arm 34. Instead, the spring 76 is coupled to the main support arm 34 by a chain 78 and to the grain bin 10 via the mounting plate 42. More specifically, in the illustrated embodiment, a first end of the spring 76 forms a hook which is coupled to the shank of a bolt 80 which secures the mounting plate 42 to the grain bin 10. The other end of the spring 76 forms a hook which is coupled to a link of the chain 78. As also shown in FIG. 5, the end of the chain 78 opposite the spring 76 is secured to a closed loop mounted on the main support arm 34. The length of the chain 78 and the spring 76 are selected such that, absent application of a restraining force to the cover 30, the force developed by the spring 76 will pivot the cover 30 out of the closed position sufficiently to ensure the switch 24 enters its opened state to preclude operation of the motor 28 and, thus, to preclude operation of the auger.

Figure 6:
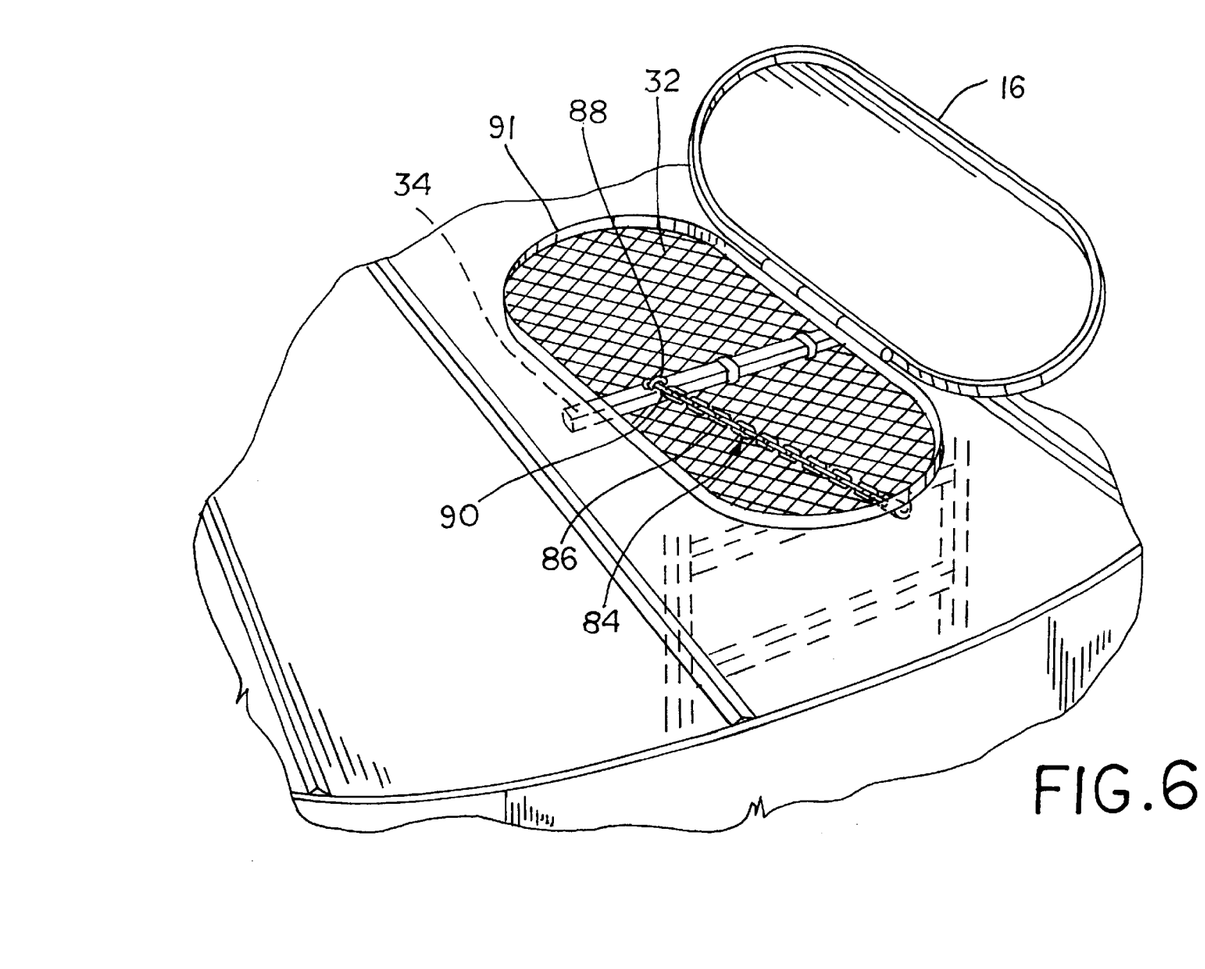
FIG. 6 is a plan view of an access opening such as that shown in FIG. 1, and illustrating the cover of the safety system in an exemplary closed position.

From the foregoing, persons of ordinary skill in the art will appreciate that the disclosed apparatus 20 ensures that the auger cannot be run unless the cover 30 is in its closed position. Such persons will further appreciate that, since the spring 76 biases the cover 30 away from the closed position, unless the cover 30 is secured, it will not remain in the closed position and the auger will be disabled. Therefore, to enable securement of the cover 30 in the closed position, the apparatus 20 is provided with a latch 84. Although persons of ordinary skill in the art will readily appreciate that the latch 84 can be implemented in many ways without departing from the scope or spirit of the invention, in the illustrated example shown in FIG. 6, the latch 84 is implemented by a chain 86. One end of the chain 86 is mounted to a surface of a raised lip 91 formed around the access opening 14 of the grain bin 10. The opposite end of the chain 86 is free and can be selectively secured to a fastening member 88 mounted on an exterior surface of the cover 30. More specifically, the free end of the chain 86 preferably includes a hook 90 or the like which can be engaged with the fastening member 88 to secure the cover 30 in the closed position. As shown in FIG. 6, in the illustrated example, the fastening member 88 is mounted to the main support arm 34.

To prevent an individual from frustrating the safety apparatus 20 by entering the grain bin 10 and latching the cover 20 in the closed position, the fastening member 88 is preferably located near the center of the cover 30 such that a person in the bin 10 cannot activate the latch 84 to hold the cover 30 in the closed position. If an individual attempts to hold the cover 30 shut (or close the switch 24 by hand) to run the auger while he/she is in the bin 10, when and if the grain starts funneling out of the bin 10, the individual will be pulled away from the cover 30 (or switch 24). Because the individual will then release the cover 30 (or switch 24) and because the latch 84 is not secured, the spring 78 will immediately move the cover 30 out of the closed position to thereby immediately cut the power supply to the auger motor 28. In view of this quick response, the auger will typically stop running before the individual is drawn under the grain and suffocated.

Figure 7:
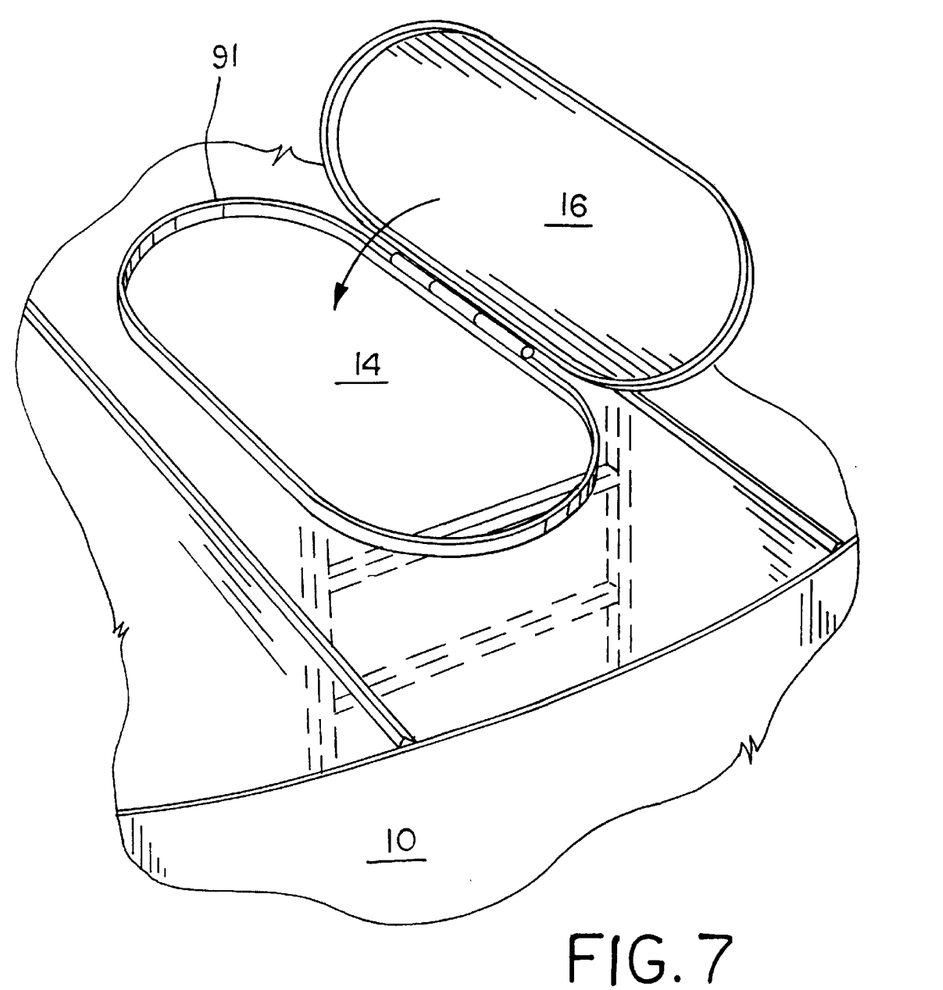
FIG. 7 is a view similar to FIG. 6, but showing the cover of the safety apparatus in an opened position.
Figure 8:
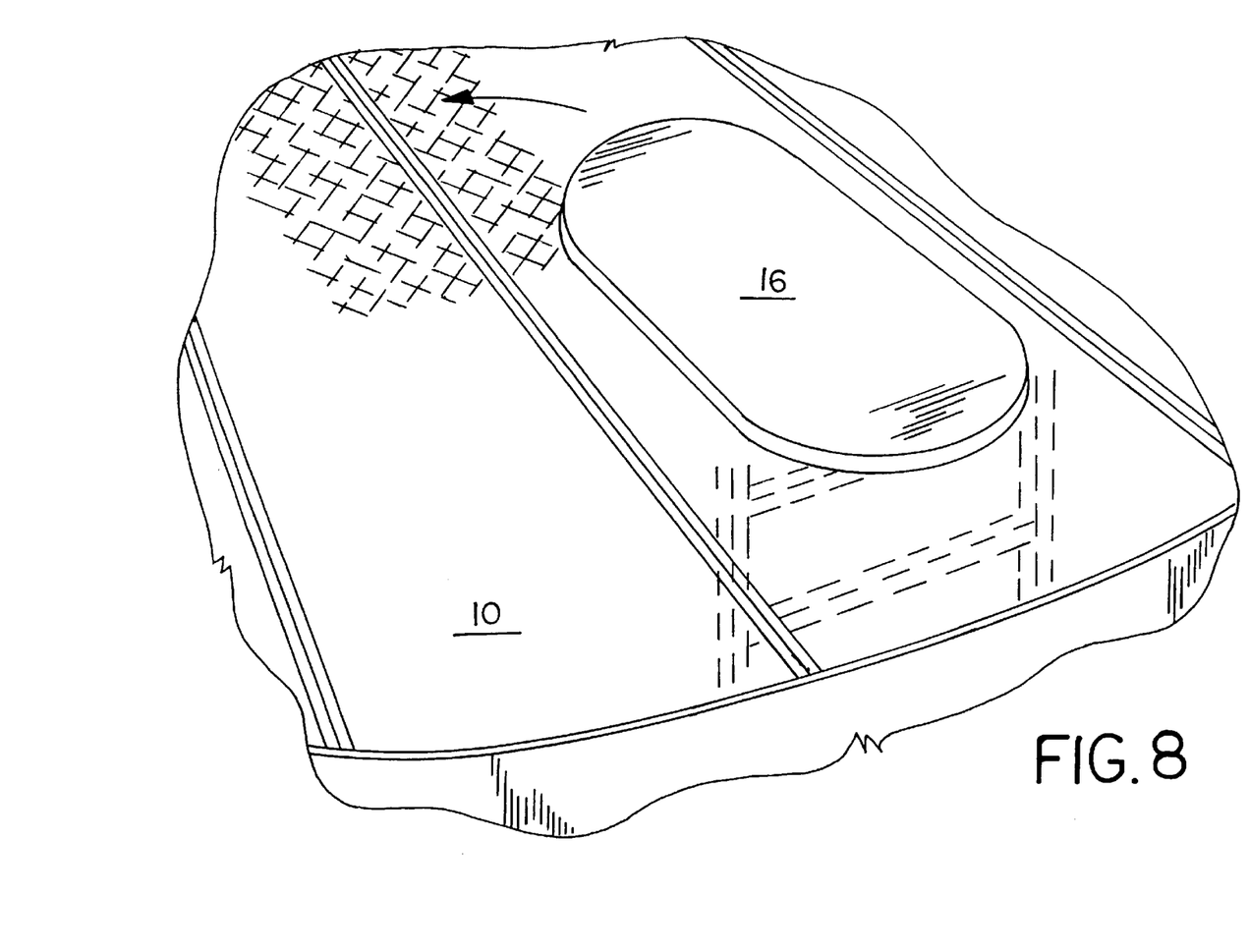
FIG. 8 is a view similar to FIG. 7, but showing the manhole cover in the closed position with the safety cover in the opened position.

As mentioned above, the cover 30 is preferably mounted within the grain bin 10. This positioning is preferred to ensure the cover 30 does not interfere with the closing of the hinged door or manhole cover 16 which protects the stored grain from weather elements (see FIGS. 7 and 8).

Persons of ordinary skill in the art will readily appreciate that, while the illustrated cover 30 is mounted within the grain bin 10 for movement in a plane that is generally parallel to the plane of the access opening 14, other locations and/or mounting arrangements may be employed without departing from the scope or spirit of the invention. By way of example, not limitation, the cover 30 can be mounted outside of the grain bin without departing from the scope or spirit of the invention. By way of further examples, not limitations, the cover 30 can be mounted to pivot into the grain bin 10 or out of the grain bin 10 without departing from the scope or spirit of the invention.

Persons of ordinary skill in the art will readily appreciate that many existing grain bins could benefit from being retrofitted with a safety apparatus constructed in accordance with the teachings of the invention. To this end, a kit can be provided including the components needed to retrofit existing grain bins. Such a kit would preferably include a switch 24, a cover 30, a latch 84 and a spring 76 as described above. Preferably, the kit also includes the mounting plate 42. Preferably, some or all of the switch 24, the cover 30 and the spring are at least partially pre-mounted to the plate 42 to facilitate rapid installation.

A person could then use the kit to reduce the risk of suffocation in a grain bin by mounting the mounting plate 42 and, thus, the cover 30 to the grain bin 10 such that the cover is disposed adjacent the access opening 14 for movement between the opened and closed positions. The installer would then connect the switch 24 in circuit with the auger motor 28 such that opening the switch precludes operation of the motor 28 as explained above. The cover 30 and the switch 24 are located to interact such that the switch opens when the cover 30 is not in the closed position. As explained above, the cover 30 is biased away from the closed position such that the auger cannot be operated unless the cover 30 is secured in the closed position.

Although certain examples of apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

I claim:

1. For use with a grain bin having an auger, a motor for driving the auger, and an access opening, a safety apparatus comprising:

an electrical switch in circuit with the motor, the switch having a first state wherein the switch prevents operation of the motor and a second state wherein the switch permits operation of the motor;

a cover mounted adjacent the access opening for movement between a first position wherein the cover precludes human entry through the access opening and a second position wherein the cover is displaced from the first position, the switch and the cover being positioned to place the switch in the second state when the cover is in the first position and to place the switch in the first state when the cover is displaced from the first position;

a latch for securing the cover in the first position; and a spring for biasing the cover toward the second position such that, when the latch and cover are released, the cover moves to the second position and the switch enters the first state to preclude operation of the motor and auger.

2. An apparatus as defined in claim 1 wherein the latch is positioned such that it cannot be operated from within the grain bin.

3. An apparatus as defined in claim 2 wherein the latch comprises:

a chain having a first, free end and a second end mounted to a surface of the grain bin; and a fastening member mounted to an exterior surface of the cover, the free end of the chain being adapted for selective securement to the fastening member to secure the cover in the first position.

4. An apparatus as defined in claim 1 wherein the switch comprises a contact switch.

5. An apparatus as defined in claim 1 wherein the cover is mounted for pivoting movement between the first and second positions.

6. An apparatus as defined in claim 1 wherein the cover is mounted within the grain bin for pivoting movement between the first and second positions in a plane substantially parallel to the grain bin opening.

7. An apparatus as defined in claim 1 wherein the cover comprises:

a first arm mounted for pivoting movement between the first and second positions; and a screen mounted on the first arm.

8. An apparatus as defined in claim 7 wherein the cover further comprises a projection mounted to pivot with the first arm and to engage the switch when the cover is in the first position.

9. An apparatus as defined in claim 8 wherein the projection comprises a bolt.

10. An apparatus as defined in claim 8 further comprising a second arm operatively coupled to the first arm, and wherein the projection is mounted to the second arm.

11. An apparatus as defined in claim 10 further comprising a stop member mounted to the second arm for defining the first position of the cover.

12. An apparatus as defined in claim 11 wherein the stop member comprises a bolt.

13. An apparatus as defined in claim 7 wherein the spring is operatively coupled between the grain bin and the first arm.

14. Apparatus as defined in claim 13 wherein the spring is operatively coupled to the grain bin through a mounting plate.

15. An apparatus as defined in claim 14 wherein the spring is coupled to the first arm by a chain.

16. An apparatus as defined in claim 1 further comprising a catch located to cooperate with a portion of the cover to define the first position.

17. An apparatus as defied in claim 1 further comprising a stop member located to define the first position of the cover.

18. A kit for use with a grain bin having an auger, a motor for driving the auger, and an access opening for entering the bin, the kit comprising:
- an electrical switch adapted to be connected in circuit with the motor to selectively prevent operation thereof;
- a cover adapted to be mounted adjacent the access opening of the grain bin for movement between a first position wherein the cover precludes human entry through the access opening and a second position wherein the cover is displaced from the first position, the cover being adapted to disengage the switch to permit operation of the motor when the cover is displaced from the first position and to operatively engage the switch to permit operation of the motor when the cover is in the first position;
- a latch adapted to secure the cover in the first position; and
- a spring adapted to bias the cover toward the second position such that, when the kit is assembled and mounted to the grain bin and the latch and cover are released, the cover moves away from the first position and the switch precludes operation of the motor and auger.

19. For use with a grain bin having an auger, a motor for driving the auger, and an access opening, a safety apparatus comprising:
- an electrical switch in circuit with the motor, the switch having a first state wherein the switch prevents operation of the motor and a second state wherein the switch permits operation of the motor;
- a cover mounted adjacent the access opening for movement between a first position wherein the cover precludes human entry through the access opening and a second position wherein the cover is displaced from the first position;
- means for placing the switch in the second state when the cover is in the first position and for placing the switch in the first state when the cover is displaced from the first position;
- a latch for securing the cover in the first position; and
- a spring for biasing the cover toward the second position such that, when the latch and cover are released, the cover moves to the second position and the switch enters the first state to preclude operation of the motor and auger.

20. An apparatus as defined in claim 19 wherein the placing means comprises a sensor for detecting the position of the cover and a logic circuit in communication with the sensor for changing the state of the switch based on the output of the sensor.

21. An apparatus as defined in claim 19 wherein the placing means comprises a projection operatively coupled to the cover for operatively engaging the switch to place the switch in the first state when the cover enters the first position.

22. A method for reducing a risk of suffocation within a grain bin having an auger, a motor for running the auger, and an access opening, the method comprising the steps of:
- mounting a cover adjacent the access opening for movement between a first position wherein the cover precludes human entry through the access opening and a second position wherein the cover is displaced from the first position;
- placing a switch in circuit with the motor such that placing the switch in a first operative state precludes operation of the auger and placing the switch in a second operative state permits operation of the auger;
- locating the cover and the switch for interaction such that the switch enters the first operative state when the cover is displaced from the first position; and
- biasing the cover toward the second position such that the auger cannot be operated unless the cover is secured in the first position.

* * * * *